US 8,128,315 B2

(12) United States Patent
Dawney et al.

(10) Patent No.: US 8,128,315 B2
(45) Date of Patent: Mar. 6, 2012

(54) FITTING

(75) Inventors: Glen Frederick Dawney, Tweed Heads West (AU); Adrian Mark Croft, Tweed Heads West (AU)

(73) Assignees: Glen Frederick Dawney, Tweed Heads West (AU); Adrian Mark Croft, Tweed Heads West (AU)

( * ) Notice: Subject to any disclaimer, the term of this patent is extended or adjusted under 35 U.S.C. 154(b) by 296 days.

(21) Appl. No.: 12/385,191

(22) Filed: Apr. 1, 2009

(65) Prior Publication Data

US 2009/0245938 A1    Oct. 1, 2009

(30) Foreign Application Priority Data

Apr. 1, 2008 (AU) ................................. 2008201479

(51) Int. Cl.
*E02B 11/00* (2006.01)
(52) U.S. Cl. ........................................... 405/47; 47/65.6
(58) Field of Classification Search .................... 405/47, 405/48, 36; 47/65.6, 66.2, 80; 138/40
See application file for complete search history.

(56) References Cited

U.S. PATENT DOCUMENTS

| | | | | |
|---|---|---|---|---|
| 1,129,324 A * | 2/1915 | Appelman | ...................... | 405/45 |
| 2,834,153 A * | 5/1958 | Fearn | ............................. | 47/66.2 |
| 3,362,105 A * | 1/1968 | Steiger | ................................. | 47/73 |
| 4,173,098 A * | 11/1979 | Smith | .................................. | 47/80 |
| 4,231,187 A * | 11/1980 | Greenbaum | ........................ | 47/80 |
| 4,829,709 A * | 5/1989 | Centafanti | .......................... | 47/79 |
| 4,860,491 A * | 8/1989 | Panuski | .......................... | 47/65.6 |
| 4,910,811 A * | 3/1990 | Izzi, Sr. | ............................. | 4/292 |
| 5,345,714 A * | 9/1994 | Washington | ...................... | 47/70 |
| 5,446,994 A * | 9/1995 | Chou | .................................. | 47/81 |
| 5,448,854 A * | 9/1995 | Hirsch et al. | .................... | 47/65.6 |
| 6,687,925 B2 * | 2/2004 | Minnick | ........................... | 4/613 |

FOREIGN PATENT DOCUMENTS

| JP | 10-243862 | 9/1998 |
|---|---|---|
| JP | 2002-238358 | 8/2002 |
| JP | 2003-222290 | 8/2003 |

\* cited by examiner

*Primary Examiner* — Tara Mayo-Pinnock
(74) *Attorney, Agent, or Firm* — Stein McEwen, LLP

(57) ABSTRACT

A fitting comprising at least one inlet and at least one outlet, a body disposed between said at least one inlet and at least one outlet wherein the body defines at least one flowpath through the fitting, the body further comprising one or more apertures located intermediate said at least one inlet and said at least one outlet, and two or more flanges extending outwardly from the body and spaced apart from one another, and wherein the one or more apertures are located intermediate the two or more flanges.

9 Claims, 3 Drawing Sheets ively for simplicity as "planter boxes") is essential to prevent

FITTING

FIELD OF THE INVENTION

The present invention relates to a fitting. In particular, the present invention relates to a fitting for assisting with the drainage of fluids, and, specifically, the drainage of fluids from soils or the like.

BACKGROUND OF THE INVENTION

There are many applications in which providing adequate fluid drainage is important. In horticultural applications, for instance, drainage of fluids such as water from planter boxes, garden beds, pots and the like (hereinafter referred to collectively for simplicity as "planter boxes") is essential to prevent the soil in the planter box from becoming waterlogged, as excessive amounts of water can prove fatal to plants.

In some situations, it is possible to simply provide drainage holes in the bottom of a planter box in order to allow excess water to drain away through the holes. However, in some locations, such as inside buildings, on balconies, or in locations where water draining onto a surface could make the surface slippery and hazardous for pedestrians, simply draining water out through the base of the planter box is not an ideal solution.

Thus, there would be an advantage if it were possible to provide a device which allowed excess water to be drained from a planter box without damaging floors or other surfaces, and without creating a safety hazard.

It will be clearly understood that, if a prior art publication is referred to herein, this reference does not constitute an admission that the publication forms part of the common general knowledge in the art in Australia or in any other country.

Throughout this specification, the term "comprising" and its grammatical equivalents shall be taken to have an inclusive meaning unless the context of use indicates otherwise.

SUMMARY OF THE INVENTION

It is an object of the present invention to provide a fitting which may overcome at least some of the abovementioned disadvantages, or provide a useful or commercial choice.

In one aspect, the invention resides broadly in a fitting comprising at least one inlet and at least one outlet, a body disposed between said at least one inlet and at least one outlet wherein the body defines at least one flowpath through the fitting, the body further comprising one or more apertures located intermediate said at least one inlet and said at least one outlet, and two or more flanges extending outwardly from the body and spaced apart from one another, and wherein the one or more apertures are located intermediate the two or more flanges.

The body of the fitting may be of any suitable configuration. Preferably, however, the body of the fitting is at least partially hollow, such that a flowpath is defined along the entire length of the fitting. The flowpath through the fitting may be of any form, such as linear, angled, curved or tortuous, and the shape of configuration of the flowpath may be determined by the application to which the fitting is to be applied, or the physical location in which the fitting is to be placed.

Preferably, the at least one inlet defines a first end of the flowpath, and the at least one outlet defines a second end of the flowpath. Preferably, the at least one inlet and the at least one outlet are in fluid communication with one another. In some embodiments of the invention, the at least one inlet is located in an upper portion of the fitting while the at least one outlet is located in a lower portion of the fitting, such that any fluid flowing along the flowpath may flow at least partially under gravity.

In a preferred embodiment of the invention, each of said at least one inlet and at least one outlet may be configured so as to enable the fitting to be connected to another device, such as a pipe, conduit, drain, channel, floor waste, another fitting (including a fitting according to the present invention) or the like, or any combination thereof. The fitting may be adapted for permanent or temporary connection to another device, and the fitting may be connected to another device using any suitable technique. The portion of the body of the fitting adjacent the at least one inlet and/or the at least one outlet may be configured so as to allow the fitting to be connected to another device. Thus, the portion of the body of the fitting adjacent the at least one inlet and/or the at least one outlet may be tapered, flared, provided with connection means (such as a screw thread) or a locking mechanism in order to allow the fitting to be connected to another device.

The one or more apertures may be of any suitable size, shape or arrangement. Preferably, the one or more apertures extend entirely through a wall of the body, such that the flowpath is in fluid communication with the environment surrounding the fitting through the one or more apertures. Preferably, the one or more apertures are of sufficient size to allow small debris (gravel, soil or the like) to pass into the flowpath without the apertures or the flowpath becoming blocked.

The two or more flanges may be provided at any suitable point on the body. The two or more flanges extend outwardly from the body of the fitting at any suitable angle, and for any suitable distance. Preferably, the two or more flanges extend outwardly from the body of the fitting substantially parallel to one another. The two or more flanges may be of any shape, size or configuration. For instance, the two or more flanges may be circular, square, rectangular, triangular, pentagonal, hexagonal or the like, or any combination thereof, when viewed in plan view. Similarly, the two or more flanges may have any suitable profile, such as flat, curved or the like when viewed from the side. The exact configuration of the two or more flanges is not critical. The lower flange is suitably arranged so that it can be flush with a floor near a drainage outlet. In this embodiment, the fitting may be arranged such that the lower outlet extends into the drainage outlet so that liquid draining through the flow passage passes into the drainage outlet. The lower flange rests upon the floor surrounding the drainage outlet and acts to correctly position the fitting relative to the drainage outlet. The other flange acts to minimize the likelihood of soil or other particulate matter from entering into the apertures and blocking the apertures. It will also be understood that liquid may enter the drainage outlet by either flowing into the inlet or by flowing into the apertures.

In one embodiment, the fitting is adapted to be used in conjunction with a drainage outlet for a planter box or garden bed or the like. In this embodiment, the planter box or garden bed or the like may be provided with a drainage cell arrangement positioned adjacent the floor of the planter box, drainage cell or the like. Suitably, the space between the flanges is sufficiently wide to receive part of the drainage cell. In other words, the space between the flanges is equal to or slightly larger than the height of the drainage cell material.

The two or more flanges may be formed integrally with the body of the fitting, or may be formed separately and then connected, either temporarily or permanently, to the body of the fitting using any suitable technique. Each of the two or more flanges may be formed as a single piece (such as an annulus, wherein the body of the fitting passes through the aperture of the annulus) or as two or more separate pieces which are connected together to form the flange.

In some embodiments of the invention, the fitting may be provided with one or more spacers. The spacers may be adapted to maintain a constant spacing between two flanges. Preferably, the one or more spacers extend at least a portion of the distance between two flanges. More preferably, the one or more spacers extend the entire distance between two flanges. In some embodiments of the invention, the one or more spacers are connected, either permanently or temporarily to each of the two flanges.

The fitting may be constructed from any suitable material. Preferably, the fitting is constructed from a material that is corrosion resistant, resistant to degradation from exposure to the elements, has good chemical resistance, heat resistance or the like, or any combination thereof. In some embodiments of the invention, the fitting may be constructed from metal, such as aluminium or stainless steel, plastic, such as PVC or polypropylene, fiberglass or the like, or any suitable combination of materials.

The present invention also encompasses select of the present invention as part of a drainage system from a planter box, garden bed or the like.

In a second aspect, the present invention provides a planter box, garden bed or the like having a floor, and at least one drainage outlet in the floor and a layer of plant growth medium above the floor, wherein the drainage outlet is fitted with a fitting as described with reference to the first aspect of the present invention.

The planter box, garden bed or the like may have a drainage cell material resting on the floor and a spacing between the flanges of the fitting may be essentially the same as or slightly larger than the height of the drainage cell material.

The planter box, garden bed or the like may be provided with one or more of a gravel layer, a filtration layer, a geotextile fabric and the like.

Although this device has been discussed with particular reference to horticultural applications, the skilled addressee will understand that the present invention could be applied to any situation in which liquids must be drained.

BRIEF DESCRIPTION OF THE DRAWINGS

An embodiment of the invention will be described with reference to the following drawings in which.

DETAILED DESCRIPTION OF THE DRAWINGS

Figure 1:
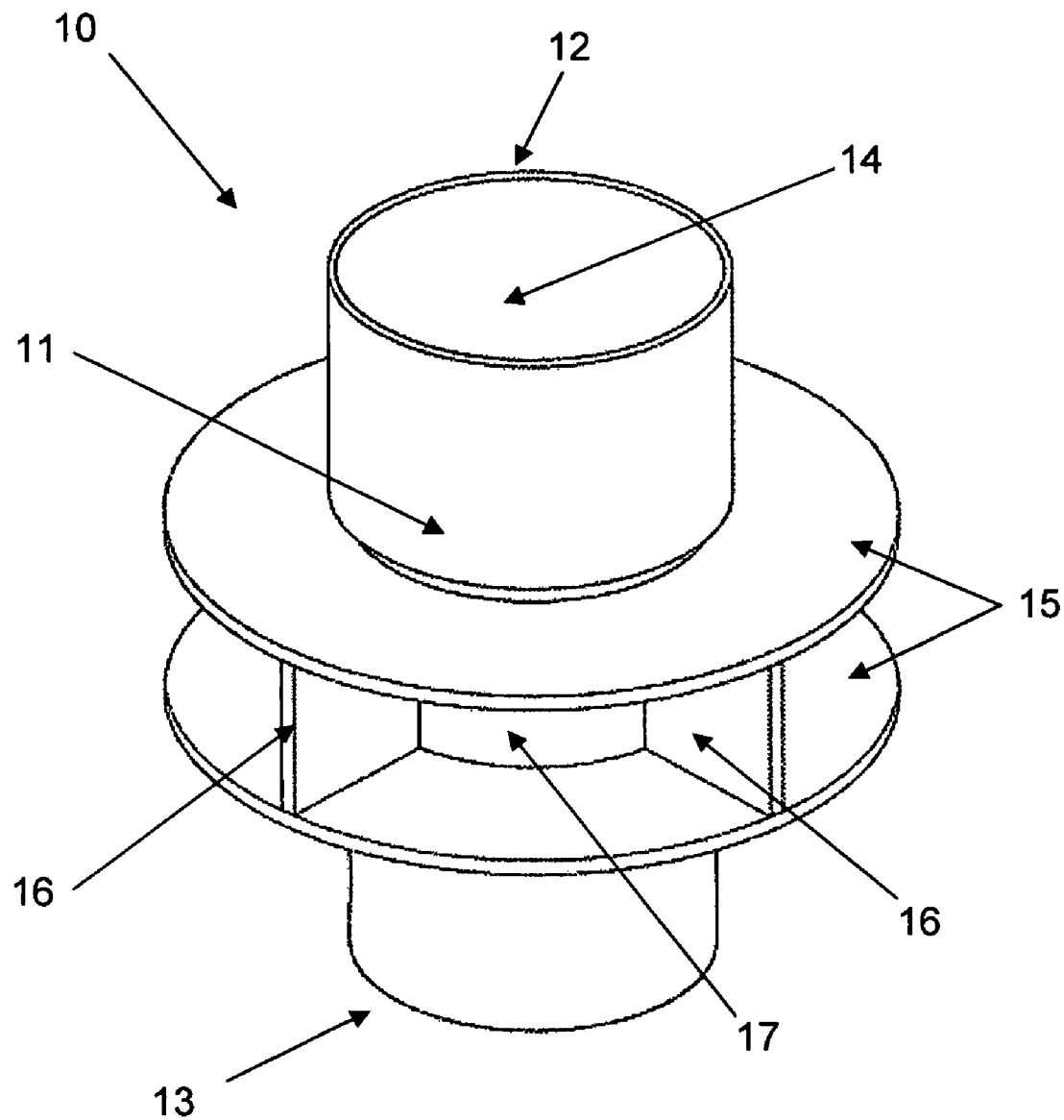
FIG. 1 illustrates a perspective view of a fitting according to an embodiment of the present invention.

It will be appreciated that the drawings have been provided for the purposes of illustrating preferred embodiments of the present invention and that the invention should not be considered to be limited solely to the features as shown in the drawings.

In FIG. 1 there is shown a fitting 10 according to an embodiment of the present invention. The fitting 10 comprises a body 11 having an inlet 12 in an upper portion of the body 11 and an outlet 13 in a lower portion of the body 11. The body 11 is substantially cylindrical, the body 11 defining a flowpath 14 between the inlet 12 and the outlet 13.

The fitting further comprises a pair of flanges 15 in the form of annular discs extending outwardly from the body 11 of the fitting 10. The flanges 15 extend outwardly substantially parallel to one another from the body 11 and are maintained at a constant spacing from one another by the presence of spacers 16 that extend between said pair of flanges 15.

The fitting 10 also comprises a plurality of apertures 17 located intermediate the pair of flanges 15. Each of said apertures extends entirely through the body 11 so that the flowpath 14 is in fluid communication with the environment outside the fitting 10.

Figure 2:
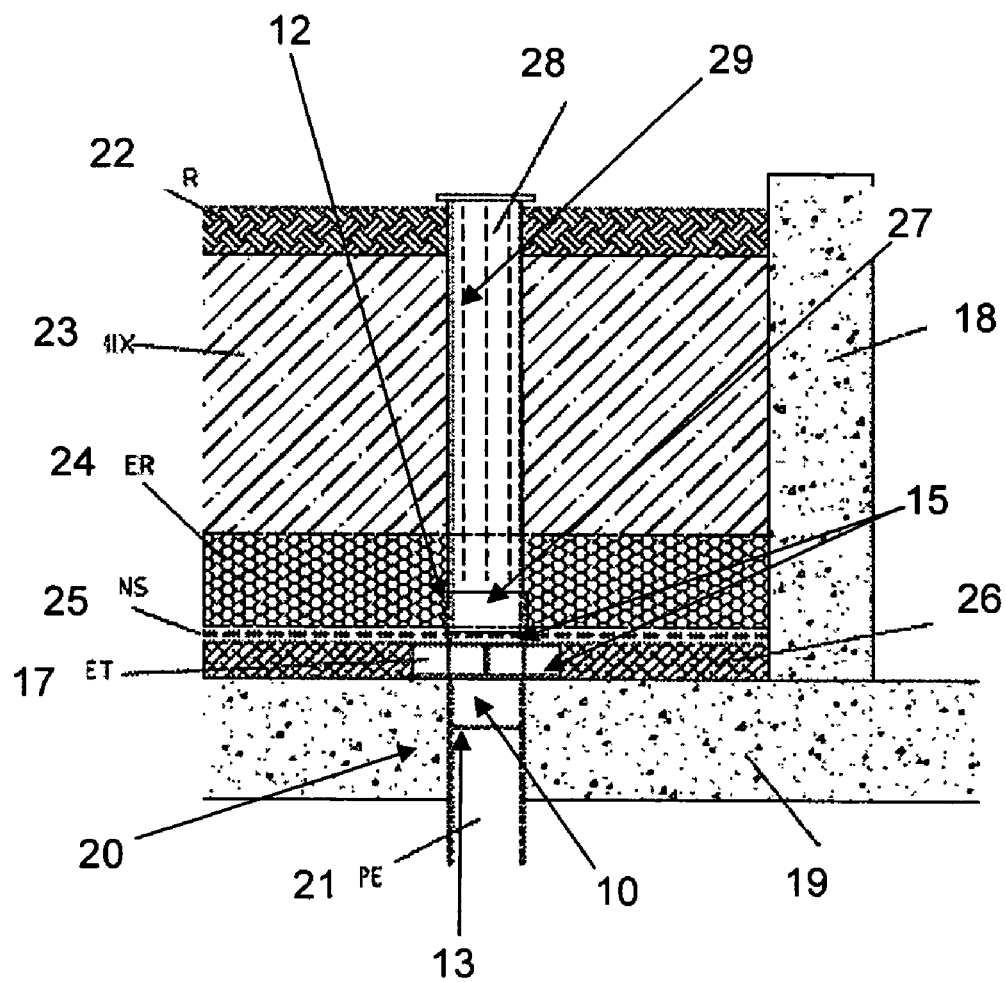
FIG. 2 illustrates a cross-sectional view of a fitting according to an embodiment of the present invention when in use.

In FIG. 2, a fitting 10 according to an embodiment of the present invention is shown when in use. The fitting 10 is shown when in use in a planter box 18, such as found on a balcony or similar location, having as its base a concrete slab 19. The concrete slab is provided with a hole 20 fitted with a waste pipe 21 through which fluid collected in the planter box 18 may drain.

The planter box 18 is provided with several different layers of material, including a mulch layer 22, a soil mixture layer 23, a filtration layer 24, a layer of geotextile cloth 25 and a drainage cell 26. The one or more apertures 17 of the fitting 10 are located in the drainage cell 26 such that any water or other liquids that filter downwards through the upper layers by gravity may enter the fitting 10 through the one or more apertures 17 and be removed from the planter box 18 via the outlet 13 and through the waste pipe 21 to which the outlet 13 is connected. It may be more clearly seen in this figure that the flanges 15 serve to prevent the apertures 17 from becoming blocked or obstructed with debris.

The inlet 12 of the fitting is provided with a flared portion 27 adapted for connection to a pipe 28 which extends upwardly through the planter box 18 to just above the surface of the mulch layer 22. The pipe 28 serves as a breather pipe to ensure the smooth flow of water or other liquids through the waste pipe 21, as well as assisting in removing any excess liquid that is retained on the surface of the mulch layer 22.

The pipe 28 may also be provided with a plurality of slots 29 which serve to drain water or other liquids away from the mulch layer 22, the soil mix layer 23 and the filtration layer 24 and into the waste pipe 21 via the fitting 10. In some embodiments of the invention, the pipe 28 may be provided with a sleeve (not shown) adapted to prevent the slots 29 from becoming blocked by dirt, gravel and other debris.

Figure 3:
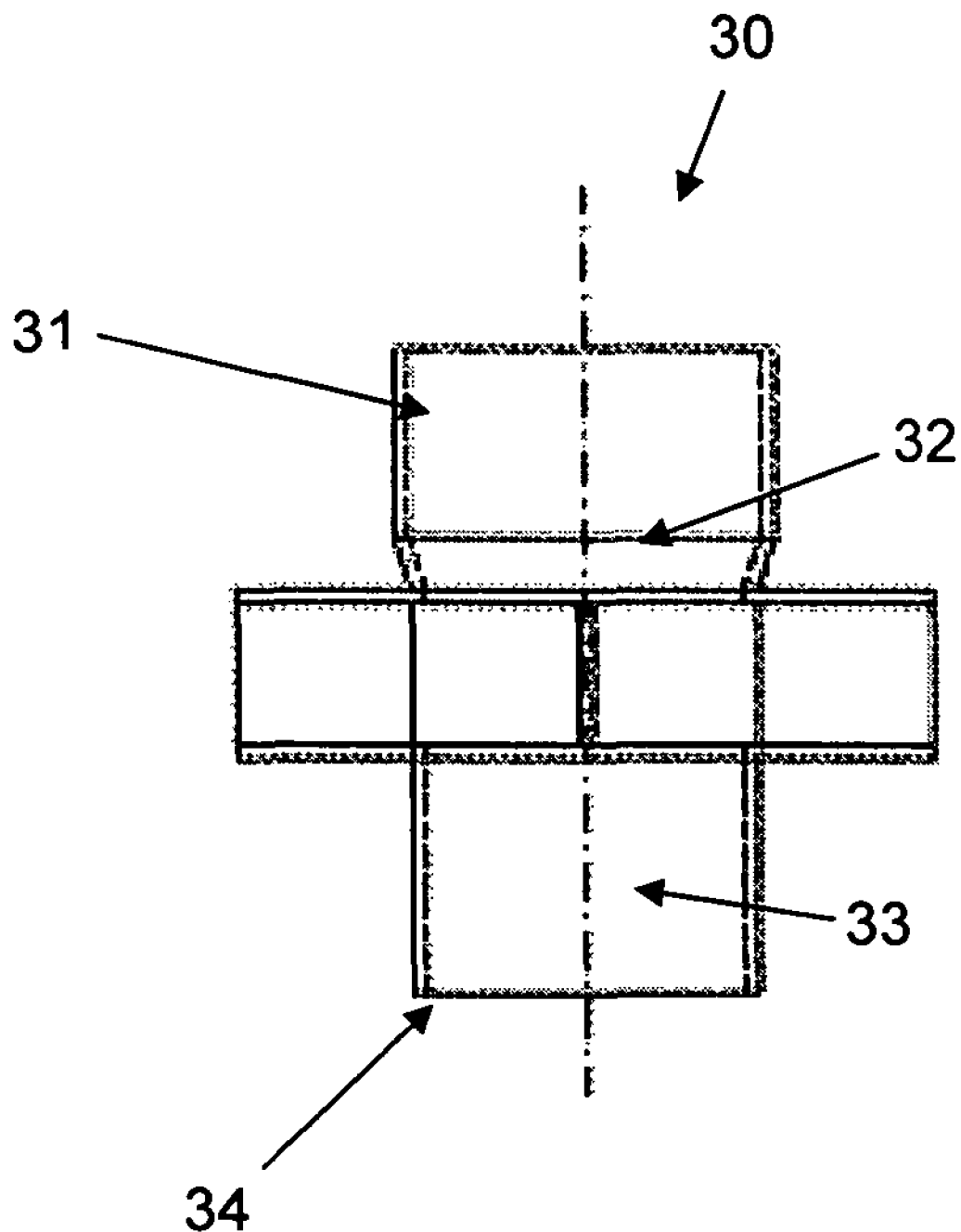
FIG. 3 illustrates a side view of a fitting according to an embodiment of the present invention.

Turning now to FIG. 3, there is shown a fitting 30 according to an alternative embodiment of the present invention. The upper portion 31 of the body 32 is flared so as to enable a pipe, conduit or the like (not shown) to be retained within the upper portion 31. The lower portion 33 of the body 32 tapers towards the outlet 34 so that it may more easily engage with a pipe, floor waste, drainage outlet or the like (not shown).

Those skilled in the art will appreciate that the present invention may be susceptible to variations and modifications other than those specifically described. It will be understood that the present invention encompasses all such variations and modifications that fall within its spirit and scope.

What is claimed is:

1. A drainage device for draining fluid from a garden bed, planter box, or pot, the drainage device comprising at least one inlet and at least one outlet, wherein each of the at least one inlet and at least one outlet are adapted for connection to a pipe, conduit, or waste, a body disposed between said at least one inlet and at least one outlet wherein the body defines at least one flowpath through the drainage device, the body further comprising one or more apertures located intermediate said at least one inlet and said at least one outlet, wherein the one or more apertures are adapted to allow a fluid to enter the flowpath at a point intermediate the outlet and the inlet, and two or more flanges extending outwardly from the body and spaced apart from one another, and wherein the one or more apertures are located intermediate the two or more flanges, and wherein the drainage device further comprises one or more spacers connected to, and extending between, at least two of the two or more flanges, the one or more spaces adapted to maintain a constant space between said flanges.

2. A drainage device according to claim 1 wherein the at least one inlet and the at least one outlet are in fluid communication with one another.

3. A drainage device according to claim 1 wherein the at least one inlet is located in an upper portion of the drainage device and the at least one outlet is located in a lower portion of the drainage device.

4. A drainage device according to claim 1 wherein the one or more apertures are in fluid communication with the flowpath.

5. A drainage device according to claim 1 wherein each of said at least one inlet and at least one outlet are adapted for connection to one or more devices.

6. A drainage device according to claim 5 in combination with one or more flow devices.

7. A drainage device according to claim 1 wherein the two or more flanges extend outwardly substantially horizontally from the body of the drainage device.

8. A drainage device according to claim 1 wherein the drainage device is constructed from metal, plastic or fiberglass.

9. A planter box or garden bed having a floor, at least one drainage outlet in the floor and a layer of plant growth medium above the floor, wherein the drainage outlet is fitted with a drainage device as claimed in claim 1.

* * * * *